United States Patent [19]

Battisti et al.

[11] 4,285,863

[45] Aug. 25, 1981

[54] PIGMENT COMPOUNDS AND METHOD OF PREPARATIONS

[75] Inventors: Ruggero Battisti; Francesco Casagrande, both of Novara; Giovanni Bausani, Trecate, all of Italy

[73] Assignee: Montedison S.p.A., Milan, Italy

[21] Appl. No.: 51,443

[22] Filed: Jun. 25, 1979

[30] Foreign Application Priority Data

Jun. 26, 1978 [IT] Italy ............................... 24947 A/78

[51] Int. Cl.³ ..................... C09B 43/00; C09B 56/00; C09B 57/00; D06P 1/44

[52] U.S. Cl. ............................. 260/176; 106/288 Q; 106/308 Q; 106/309; 260/174; 260/178; 260/193; 260/207.1; 260/465 D

[58] Field of Search ............... 260/157, 158, 160, 174, 260/176, 178, 456 D, 456 E; 542/418, 420, 421

[56] References Cited

U.S. PATENT DOCUMENTS

| | | | |
|---|---|---|---|
| 3,069,456 | 12/1962 | Strobel et al. | 260/465 D |
| 3,257,393 | 6/1966 | Vinton | 260/465 D X |
| 3,257,394 | 6/1966 | Cohen | 260/465 D X |
| 3,386,491 | 6/1968 | Weaver et al. | 260/465 D X |
| 3,717,625 | 2/1973 | Peter et al. | 260/207.1 |

*Primary Examiner*—Floyd D. Higel
*Attorney, Agent, or Firm*—Morgan, Finnegan, Pine, Foley & Lee

[57] ABSTRACT

There are provided new pigments of the "bismethinic" type having the formula

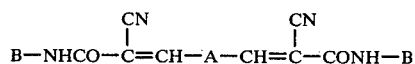

where A is benzene, 2,5-dimethoxy-benzene, 2,5-dichlorobenzene, naphthalene, diphenyl or anthracene, and B is azobenzene, azotoluene, 2-methoxy-5-benzanilide, 2-methoxy-3',4'-chloroazobenzene, 2-hydroxy-5-methyl-benzene, 2-methoxy-5-benzoylamino-benzene, 2-methoxy-5-ureido-benzene, 2-chloro-5-carboxybenzene, 2,4-dichloro-benzene, 2,5-dimethoxy-4-chlorobenzene, benzothiazole, 1-(3-chlorophenyl)-pyrazole, 1-(3,4-dichlorophenyl)-pyrazole, indazole, 2,4-dimethoxy-benzene, 4-dimethylamino-benzene, benzimidazolone, 2-methoxy-5-acetylamino-benzene or 2-methoxy-benzene.

1 Claim, No Drawings

PIGMENT COMPOUNDS AND METHOD OF PREPARATIONS

The pigments of formula (I) are insoluble in water and in most of the organic solvents. They impart a dyeing with shades from yellow to red, showing a good dyeing power, an excellent fastness to light, to migration and to overpainting.

The pigments of this invention are used in the pigmentation of plastic materials, such as, for instance, polyvinyl chloride, polystyrene and polyolefines, and in the preparation of paints, stoving enamels, inks and pastes for the printing of fabrics.

OBJECTS OF THE INVENTION

It is an object of this invention to provide a new class of pigments possessing excellent characteristics suited for the uses specified above.

This and other objects which will be apparent to those skilled in the art from the following description, are provided by this invention.

DESCRIPTION OF THE INVENTION

According to this invention, there is provided a new class of compounds having the formula (I):

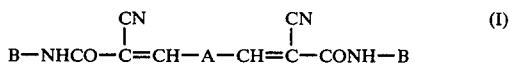

wherein: A represents a phenyl, diphenyl, naphthilic or anthracenic group, also, in turn, substituted with groups selected from among halogens, alkyl groups having from 1 to 4 carbon atoms, alkoxyl groups having from 1 to 4 carbon atoms; B represents a phenyl, a naphthyl, anthraquinone, heterocyclic group such as benzothiazol, pyrazol, pyridine, isoindazol, benzimidazolone, even substituted with groups selected from among hydroxyl, halogens, alkyl groups having from 1 to 4 carbon atoms, alkoxyl groups having from 1 to 4 carbon atoms, carboxylic, carbamoylic, benzamidic, acylaminic, benzoylaminic, dialkylaminic groups having from 1 to 4 carbon atoms in the alkyl, ureidic, thioureidic groups, arylazo groups, also, in turn, substituted in the aryl groups with alkyl and/or alkoxyl having up to 4 carbon atoms and halogens. This invention also provides a process for the preparation of such compounds, characterized in that a compound of formula (II):

is made to condense with a dialdehyde of formula (III): OHC—A—CHO (III), wherein A and B have the meanings already given, in an organic solvent in the presence of an organic basic catalyst, at the boiling temperature of the solvent, between about 50° and 180° C.

Preferably, A is selected from the group consisting of phenylene, 2,5-dimethoxyphenylene, 2,5-dichlorophenylene, naphthylene, diphenyl and anthracylene, and B is selected from the group consisting of azobenzene, azotoluene, 2-methoxy-5-benzanilide, 2-methoxy-3',4'-chloroazobenzene, 2-hydroxy-5-methyl-benzene, 2-methoxy-5-benzoyl-amino-benzene, 2-methoxy-5-ureido-benzene, 2-chloro-5-carboxy-benzene, 2,4-dichloro-benzene, 2,5-dimethoxy-4-chloro-benzene, benzothiazole, 1-(3-chlorophenyl)-pyrazole, 1-(3,4-dichlorophenyl)-pyrazole, indazole, 2,4-dimethoxybenzene, 4-dimethyl-amino-benzene, benzimidazolone, 2-methoxy-5-acetylamino-benzene and 2-methoxy-benzene.

The dyes of formula (I) are obtained, more particularly, by condensation of structure (II) compounds with a dialdehyde (III) according to the reaction (1):

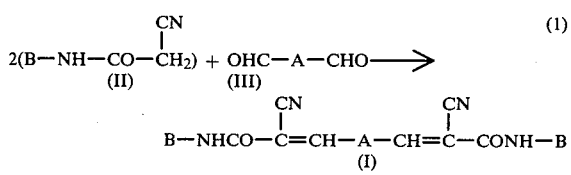

wherein A and B have the meanings indicated above.

In practice, by operating according to substantially known conventional techniques, intermediate (II) is dissolved in an inert organic solvent and this solution is then treated with a dialdehyde (III) in the presence of a basic organic catalyst, by reflux-heating for a period of from one-half hour to 1 hour. Thereby forms a precipitate which is then filtered, washed and dried. Compounds (I) thus obtained, in general, are very pure.

As inert organic solvents there may be used aliphatic alcohols with up to 6 carbon atoms, chlorobenzene and dimethylformamide.

As usable basic organic catalysts there may be mentioned pyridine, piperidine, N-alkylpiperidine, having up to 4 carbon atoms in the alkyl, pyrrolidine, morpholine, triethylamine in molar quantities of between about 0.01 and 0.2 mols per 1 mole of aldehyde (III).

Condensation reaction (1) is carried out at a temperature of between 50° and about 180° C., but preferably at the boiling temperature of the solvent used.

Intermediate (II), which participates in reaction (1), is, in turn, obtained by the condensation of an amino-derivative of formula (IV) with compound (V) (a cyanoacetic acid or ester) according to reaction (2):

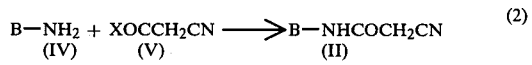

wherein: B has the meaning already indicated above and X=OH, OR, and R is a lower alkyl having up to 4 carbon atoms.

Reaction (2) is conducted, according to techniques likewise known, for instance by the direct condensation of the amino-derivative of formula (IV) with cyanoacetic ester or with cyanoacetic acid, in the presence of $PCl_5$.

Among the amino-derivatives of formula (IV) may be mentioned amino-azotoluene, amino-azobenzene, 2-methoxy-aniline, 2,5-dimethoxyaniline, 4-chloro-aniline, 2,4-dichloroaniline, 2,5-dimetoxy-4-chloroaniline, 2-methoxy-5-acetamide-aniline, piperidine, 2-methoxy-5-phenylcarbamoylaniline, N,N-dimethyl-p-phenylenediamine, 2-amino-benzothiazole, 3-amino-1-phenyl pyrazole, etc.

The dialdehydes of formula (III) are known compounds that may be prepared according to well known techniques: see, for instance, "Journal of the American Chemical Society" 72 (1950) 2992, Journal of the Chemical Society (1936) 339 and (1952) 4085.

Among the aldehydes of formula (III) there may be mentioned 2,5-dimethoxy-terephthaldehyde, terephthaldehyde, isophthaldehyde, 2,5-dichloroterephthaldehyde, 2,6-naphthalenedialdehyde, 4,4-diphenyl-dialdehyde, 9,10-anthracenedicarboxyaldehyde.

The pigments obtained according to this invention, in general, are ready for direct use, that is without further treatments. The applicative techniques are those corresponding to the techniques usually used for the single cases.

DESCRIPTION OF THE PREFERRED EMBODIMENTS

The invention will now be further illustrated by the following examples given for simply illustrative purposes.

EXAMPLE 1

22.5 g of aminoazotoluene were dissolved in 100 ml of dimethylformamide, and to this solution were added 71.5 g of ethyl cyanoacetate. The solution was then reflux-heated for about three hours. After cooling down and after acidification with hydrochloric acid, the solution was diluted with water and then the precipitated cyanacetarylide (intermediate II) was filtered. The unreacted amine remained in solution as chlorohydrate.

The solution was then filtered, washed with water until attaining neutrality and, after drying, there was obtained the cyanacetarylide of the formula:

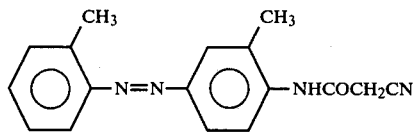

17.52 g of the cyanacetarylide thus obtained were dissolved in 200 ml of dimethylformamide and to this solution were added 5.82 g of 2,5-dimethoxyterephthalic aldehyde, 0.3 ml of piperidine and the mixture was then reflux-heated for 30 minutes. There formed an orange-tinged precipitate which was filtered and then washed with ethanol.

After drying, there were obtained 15 g of a pigment having the formula:

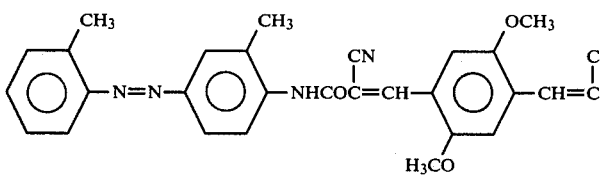

This was in the form of an orange-tinged powder, exhibiting the following percentual analysis:
Theoretical for $C_{44}H_{38}N_8O_4$:—C=71.16%; H=5.12%; N=15.09% Found:—C=71.24%; H=5.05%; N=15.00%; The IR analysis agrees with the indicated structure.

EXAMPLE 2

5 g of pigment obtained according to Example 1, were dispersed in a ball mill in 95 g of an enamel carrier consisting of 22% of alkydic resin, 19% of melaminic resin and 59% of xylene. The enamel thus obtained, after application and drying for 30 minutes at 125° C.,
showed a deep, pure orange tinge having a high fastness to light and high resistance to overpainting and to heat.

EXAMPLE 3

0.3 g of the pigment obtained according to Example 1, were dispersed in 70 g of Syncron 548 polyvinyl chloride (trade mark of Montedison) and 30 g of dioctylphthalate for 4 minutes in a double-roller mixing mill at 150° C., thereby obtaining intensely orange-colored, 0.3 mm thick sheets having an excellent fastness to light and to migration.

EXAMPLE 4

20 g of 2-methoxy-5-phenylcarbamoylaniline were dissolved in 100 ml of dimethylformamide and to this solution were added 60 g of ethyl cyanoacetate. Thereupon the solution was reflux-heated for 4 hours, after which it was brought to dryness under vacuum. The residue was treated with hydrochloric acid, then filtered, washed to neutrality with water and finally with ethanol.

After drying there was obtained a cyanoacetarylide having the formula:

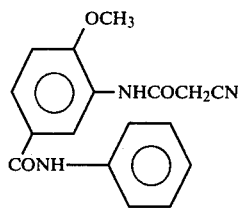

15.45 g of cyanoacetarylide thus obtained were dissolved in 75 ml of dimethylformamide and to this solution were added 3.35 g of terephthalic aldehyde, 0.25 ml of piperidine and it was then reflux-heated at 120° C. for 20 minutes. There formed a yellow precipitate which was filtered and then washed with ethanol. After drying, there were obtained 11.3 grams of a pigment having the formula:

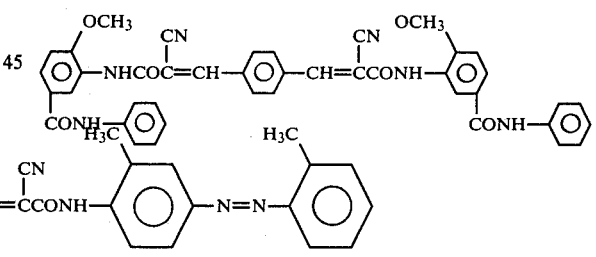

in the form of a yellow powder showing the following percentual analysis:
Theoretical for $C_{42}H_{32}N_6O_6$: C=70.39%, H=4.47%, N=11.73%; Found: for $C_{42}H_{32}N_6O_6$:C=70.28%, H=4.26%, N=11.60%; The IR analysis agreed with the indicated structure.

The pigment, applied according to Example 2, yielded a deep and pure yellow tinged enamel having a high fastness to light, to overpainting and to heat. Applied to PVC, according to procedure of Example 3, it yielded deeply yellow tinged sheets displaying an excellent fastness to light and to migration.

EXAMPLE 5

11.68 g of cyanoacetarylide of formula:

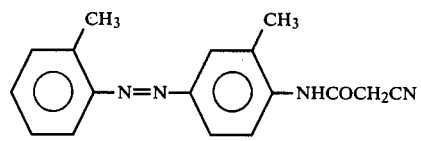

prepared according to Example 1, were dissolved in 240 ml of dimethylformamide and to this solution were then added 3.78 grams of 2,6-naphthalenedialdehyde, 0.3 ml of piperidine and this solution was then reflux-heated for 30 minutes. Thereby there formed a yellow precipitate which was filtered and then washed with ethanol.

After drying, there were obtained 8.76 g of a pigment of the formula:

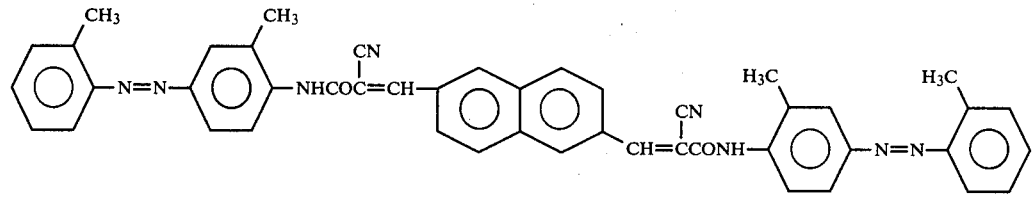

in the form of a yellow powder having the following percentual analysis:

Theoretical for $C_{46}H_{36}N_8O_2$: $C=75.41\%$, $H=4.92\%$, $N=15.30\%$; Found for $C_{46}H_{36}N_8O_2$: $C=75.63\%$, $H=4.86\%$, $N=15.28\%$; The IR analysis showed agreement with the indicated structure.

The pigment, applied according to Example 2, yielded a pure deep yellow tinged enamel having a high fastness to light, to overpainting and to heat. Applied to PVC, as indicated in Example 3, it yielded intensely yellow tinged sheets having an excellent fastness to light and to migration.

EXAMPLES 6–38

In an analogous way as described in the previous examples, there were prepared pigments having the following formula:

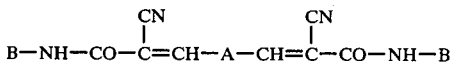

wherein substituents A and B as well as the color tone on PVC are shown in the following Table:

TABLE

| EXAMPLE | B | A | Tone on PVC |
|---|---|---|---|
| 6 | ⟨O⟩–N=N–⟨O⟩– | –⟨O⟩– | YELLOW |
| 7 | Cl, Cl–⟨O⟩–N=N–⟨O⟩(OCH₃)– | –⟨O⟩(OCH₃, H₃CO)– | ORANGE |
| 8 | ⟨O⟩(OH, H₃C)– | –⟨O⟩– | ORANGE |
| 9 | ⟨O⟩(OH, H₃C)– | –⟨OO⟩– | YELLOW/ORANGE |
| 10 | ⟨O⟩(OCH₃)– | –⟨O⟩– | YELLOW |
| 11 | ⟨O⟩(OCH₃)– | –⟨OO⟩– | YELLOW |
| 12 | ⟨O⟩(OCH₃, NH–CO–⟨O⟩)– | –⟨O⟩– | YELLOW |

TABLE-continued

| EXAMPLE | B | A | Tone on PVC |
|---|---|---|---|
| 13 | 4-OCH₃, 3-methyl phenyl with NH—CO—NH₂ | phenyl (para) | YELLOW |
| 14 | 4-OCH₃, 3-methyl phenyl with CO—NH—phenyl | phenyl (para) | YELLOW |
| 15 | 4-OCH₃, 3-methyl phenyl with CO—NH—phenyl | 4-OCH₃, 2-methyl, 5-H₃CO phenyl | ORANGE |
| 16 | 4-Cl, 3-methyl phenyl with COOH | phenyl (para) | YELLOW |
| 17 | 4-Cl, 3-methyl phenyl with COOH | 4-OCH₃, 2-methyl, 5-H₃CO phenyl | ORANGE |
| 18 | 2,4-dichloro-methylphenyl | 4-OCH₃, 2-methyl, 5-H₃CO phenyl | ORANGE |
| 19 | 4-OCH₃, 2-Cl, 3-methyl, 5-H₃CO phenyl | phenyl (para) | ORANGE |
| 20 | 4-OCH₃, 2-Cl, 3-methyl, 5-H₃CO phenyl | meta-methylphenyl | YELLOW |
| 21 | 4-OCH₃, 2-Cl, 3-methyl, 5-H₃CO phenyl | 4-OCH₃, 2-methyl, 5-H₃CO phenyl | RED |
| 22 | 4-OCH₃, 2-Cl, 3-methyl, 5-H₃CO phenyl | methylnaphthyl | ORANGE |
| 23 | benzothiazol-2-yl | phenyl (para) | YELLOW |
| 24 | 1-(3-chlorophenyl)pyrazol-yl | phenyl (para) | YELLOW |

TABLE-continued
| EXAMPLE | B | A | Tone on PVC |
|---|---|---|---|
| 25 | 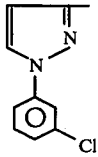 | 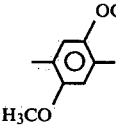 | ORANGE |
| 26 | 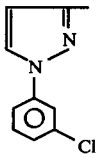 | 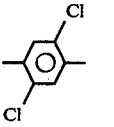 | YELLOW |
| 27 | 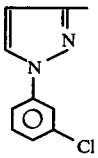 | 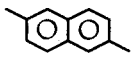 | YELLOW |
| 28 | 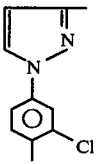 | 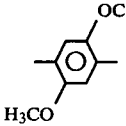 | ORANGE |
| 29 | 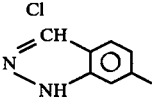 | 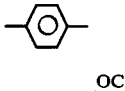 | YELLOW |
| 30 | 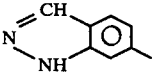 | 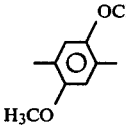 | RED/ORANGE |
| 31 | 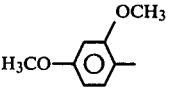 | 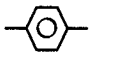 | YELLOW/ORANGE |
| 32 | 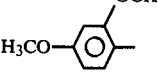 | 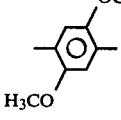 | RED |
| 33 | 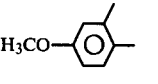 | 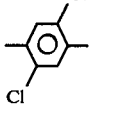 | RED |
| 34 | 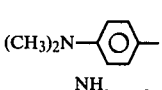 | 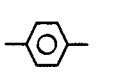 | RED/VIOLET |
| 35 | 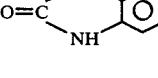 | 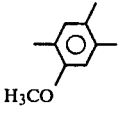 | RED |
| 36 | 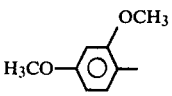 | 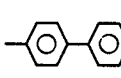 | YELLOW |
| 37 | 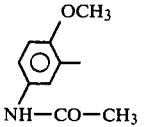 | 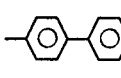 | YELLOW |

| EXAMPLE | B | A | Tone on PVC |
|---|---|---|---|
| 38 |  | —⌬—⌬— | YELLOW |

We claim:

1. A bis-methinic pigment compound having the formula $$B-NH-CO-\underset{\underset{CN}{|}}{C}=CH-A-CH=\underset{\underset{CN}{|}}{C}-CO-NH-B$$

wherein: A is selected from the group consisting of phenylene, 2,5-dimethoxyphenylene, 2,5-dichlorophenylene, naphthylene, diphenyl and anthracylene, and B is selected from the group consisting of azobenzene, azotoluene, 2-methoxy-5-benzanilide, 2-methoxy-3′,4′-chloroazobenzene, 2-hydroxy-5-methyl-benzene; 2-methoxy-5-benzoylamino-benzene, 2-methoxy-5-ureido-benzene, 2-chloro-5-carboxy-benzene, 2,4-dichloro-benzene, 2,5-dimethoxy-4-chloro-benzene, benzothiazole, 1-(3-chlorophenyl)-pyrazole, 1-(3,4-dichlorophenyl)-pyrazole, indazole, 2,4-dimethoxybenzene, 4-dimethyl-amino-benzene, benzimidazolone, 2-methoxy-5-acetylamino-benzene and 2-methoxy-benzene.

* * * * *